Sept. 18, 1934.   E. D. BOOKMAN   1,973,973
STEAM HEATER
Filed Aug. 22, 1932

Inventor
ESTHER D. BOOKMAN
By A. B. Bowman
Attorney

Patented Sept. 18, 1934

1,973,973

UNITED STATES PATENT OFFICE 1,973,973

STEAM HEATER

Esther D. Bookman, Pacific Beach, Calif.

Application August 22, 1932, Serial No. 629,832

7 Claims. (Cl. 237—16)

My invention relates to steam heaters, and the objects of my invention are: first, to provide a steam heater which incorporates a water reservoir so arranged that the water may be supplied to the heating portion in small amounts as needed; second, to provide a heater of this class which does not require an intricate piping system suitable only for a number of heaters; third, to provide a heater of this class which is unitary in its nature; fourth, to provide a heater of this class which may be operated either by gas or electricity; fifth, to provide a heater of this class which is easily and quickly installed; and, sixth, to provide on the whole a novelly constructed steam radiator or heater which is durable, efficient in its action, and which will not readily deteriorate or get out of order.

Figure 1:
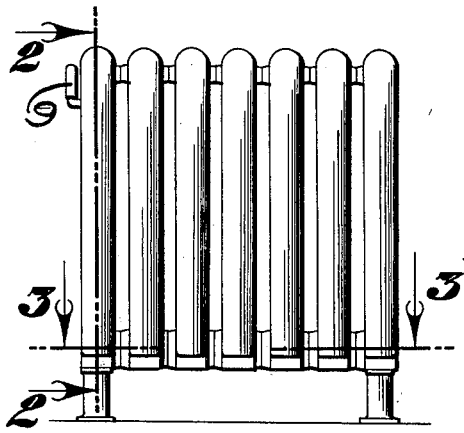
Figure 2:
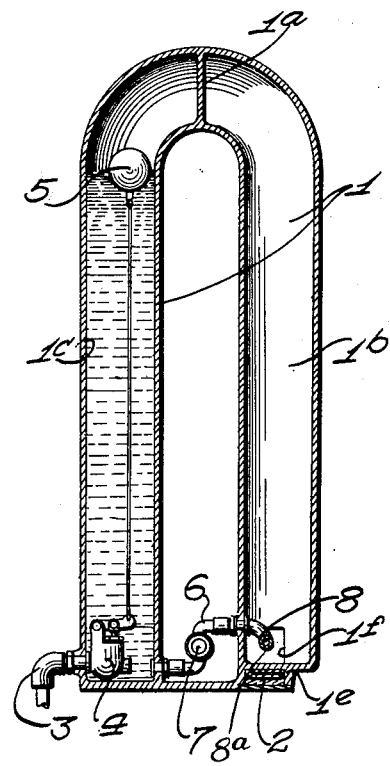
Figure 3:
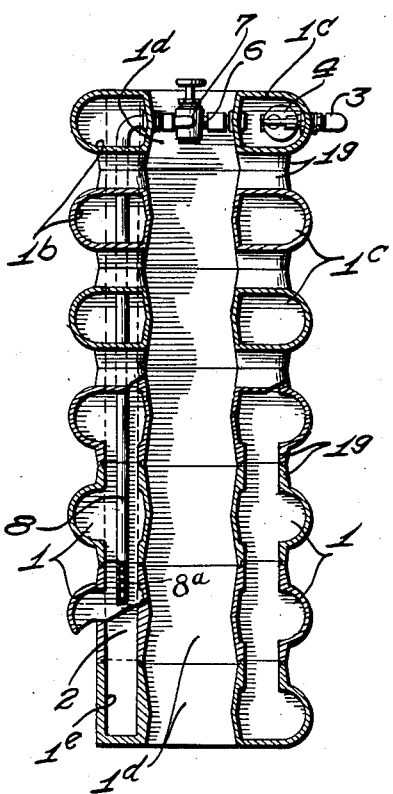

With these and other objects in view as will appear hereinafter, my invention consists of certain novel features of construction, combination and arrangement of parts and portions, as will be hereinafter described in detail and particularly set forth in the appended claims, reference being had to the accompanying drawing and to the characters of reference thereon which form a part of this application, in which:

Figure 1 is an elevational view of my steam heater; Fig. 2 is an enlarged transverse sectional view thereof through 2—2 of Fig. 1; and, Fig. 3 is an enlarged longitudinal sectional view through 3—3 of Fig. 1.

Similar characters of reference refer to similar parts and portions throughout the several views of the drawing.

Casings 1, heating element 2, water inlet pipe 3, float valve 4, float 5, conduit 6, valve 7, spray pipe 8, and safety valve 9 constitute the principal parts and portions of my novel steam heater.

A series of casings 1 are provided, each casing forming a unit of my steam heater. Each casing is in the form of an inverted U-shaped tube. A partition 1a divides each casing into a forward or steam chamber 1b and a rear or water chamber 1c, the partition 1a being disposed at the upper or cross portion of the casing, as shown best in Fig. 2. The lower ends of the two legs of each casing are closed, and their extremities may be connected by a web portion 1d. The under side of the steam chamber 1b is provided with a recess 1e. The several recesses 1e, corresponding to the several casings 1, are in alignment and are adapted to receive a heating element 2 which extends along the under sides of the steam chambers 1b.

The several casings 1 are held in spaced relation to each other by hollow bosses 1f extending from their sides adjacent the extremities of the legs forming the steam chambers 1b and also by other hollow bosses 1g similarly disposed with respect to the legs which form the water chambers 1c. Thus, the several steam chambers and the several water chambers are interconnected at their lower portions.

One of the water chambers 1c receives an inlet pipe 3 which is connected thereto through a valve 4. The valve 4 is operated by a float 5 which closes the valve when the water rises a predetermined height in the several water storage chambers. At one end the storage chambers and the steam chambers are connected by a pipe or conduit 6 in which is provided a valve 7. The valve 7 is so arranged as to allow only a slight amount of water from the reservoir chambers to the steam chambers. Within the steam chambers the conduit 6 joins a spray pipe 8 which may extend along and between the several steam chambers through the bosses 1f and is provided at its lower side with a number of fine water outlets 8a.

My steam heater operates as follows:

The heating element 2, which may be operated either by electricity or by gas, is turned on. Then the valve 7 is operated so as to cause the water to be sprayed against the closed lower ends of the steam chambers so as to become heated and form steam. A suitable safety valve 9 is provided in communication with the steam chamber.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. A steam heater comprising a series of dual casings each forming a vertically disposed steam chamber and a similar water chamber spaced therefrom, means connecting the steam chambers at their lower portions, other means connecting the water chambers at their lower portions, a heating element disposed in close relation below the steam chambers, a safety valve communicating with said steam chamber for releasing steam therefrom and a conduit for feeding water from the water chambers into the steam chambers.

2. A steam heater comprising a casing in the form of an inverted U-shaped tube, partition means dividing the casing into a vertically disposed steam chamber occupying one leg of the casing and a similar water chamber occupying the other leg of the casing, a heating element adjacent the bottom side of said steam chamber, a safety valve communicating with said steam chamber for releasing steam therefrom and a conduit for introducing water from the water chamber into the steam chamber.

3. A steam heater comprising a casing forming a pair of spaced non-communicating vertically disposed chambers arranged one in front of the other, a heating element adjacent the bottom of the forward chamber, the rear chamber arranged to receive water, a safety valve communicating with said forward chamber and means for introducing water from the rear chamber into the lower side of the forward chamber whereby said heating element immediately converts the water into steam.

4. A steam heater comprising a casing forming a pair of spaced vertically disposed chambers arranged one in front of the other, a heating element adjacent the bottom of the forward chamber, a float valve in the rear chamber connected with a source of water supply for maintaining water in the rear chamber, a safety valve communicating with said forward chamber and means for introducing water from the rear chamber into the bottom side of the forward chamber whereby said heating element immediately converts the water into steam.

5. A steam heater comprising a series of dual casings each forming a steam chamber and a spaced water reservoir chamber, means connecting the steam chambers at their lower portions, other means connecting the water chambers at their lower portions, said means forming continuous passages common to the steam chambers and to the water chambers, a heating element common to the steam chambers and disposed immediately below the passage associated therewith, a conduit communicating between the water chambers and steam chambers near the lower sides, a safety valve communicating with said steam chamber for releasing steam therefrom and a spray means connected with said conduit and extending along the passage associated with the steam chambers near the bottom thereof.

6. A steam heater comprising a series of casings in the form of inverted U-shaped tubes, a vertical partition at the upper side dividing each of the casings into a vertical steam chamber occupying one leg of the casing, and a water chamber occupying the other leg, hollow bosses at the lower ends of each casing for interconnecting the water chambers and the steam chambers respectively so as to form continuous passages therethrough, a heating element for the steam chambers against the bottom thereof, a safety valve communicating with said steam chamber for releasing steam therefrom and means for introducing water from the water chambers into the steam chambers against the bottom thereof.

7. A steam heater comprising a series of casings in the form of inverted U-shaped tubes, a vertical partition at the upper side dividing each of the casings into a vertical steam chamber occupying one leg of the casing, and a water chamber occupying the other leg, hollow bosses at the lower ends of each casing for interconnecting the water chambers and the steam chambers respectively so as to form continuous passages therethrough, a heating element for the steam chambers, a conduit connecting the water chambers with the steam chambers at the lower sides, a valve interposed in the conduit, a safety valve communicating with said steam chamber for releasing steam therefrom and a spray pipe within the passage associated with the steam chambers connected with the conduit.

ESTHER D. BOOKMAN.